Jan. 23, 1968  C. L. BOULT  3,364,673
HOROLOGE HAIRSPRING ATTACHMENT COLLET
Filed Aug. 30, 1965  2 Sheets-Sheet 1
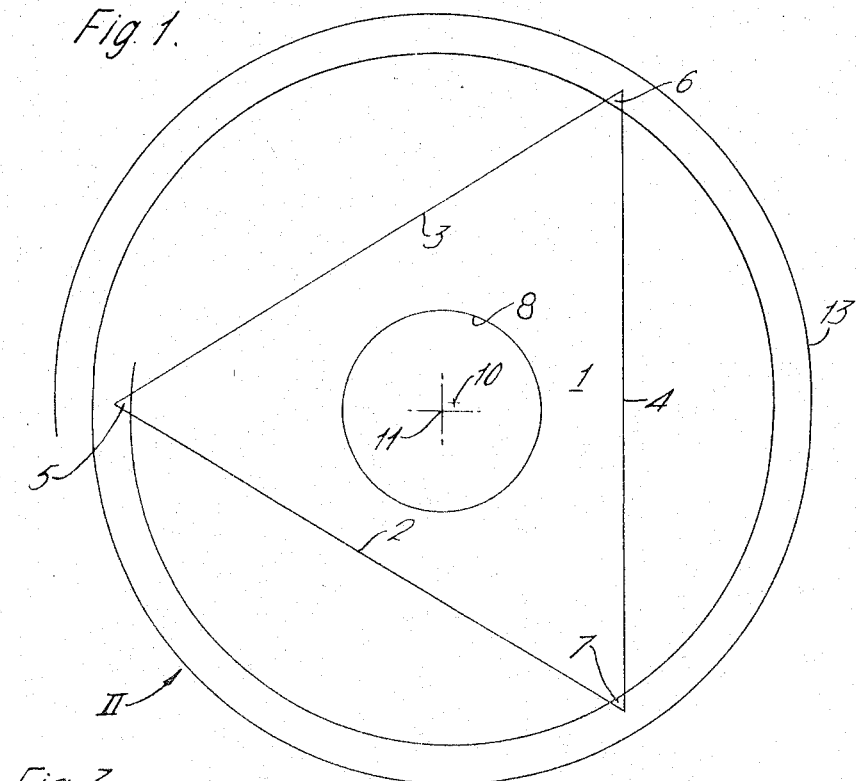
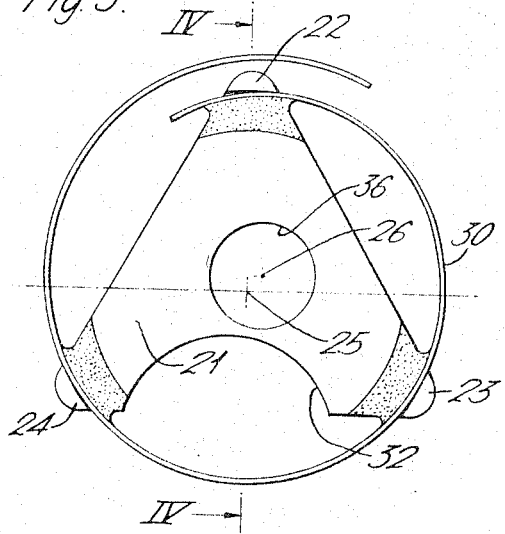
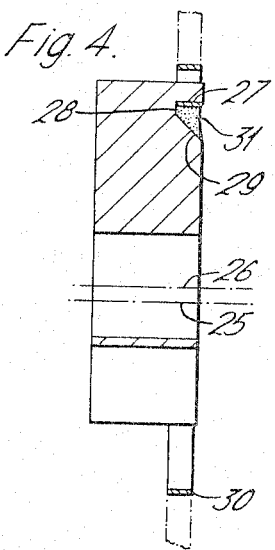
INVENTOR:
  CECIL LESLIE BoulT
ATTORNEYS:
  Hall, Pollock & Vande Sande Jan. 23, 1968  C. L. BOULT  3,364,673
HOROLOGE HAIRSPRING ATTACHMENT COLLET
Filed Aug. 30, 1965  2 Sheets-Sheet 2
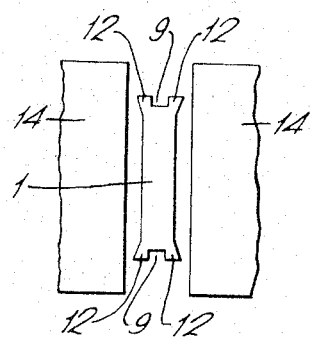
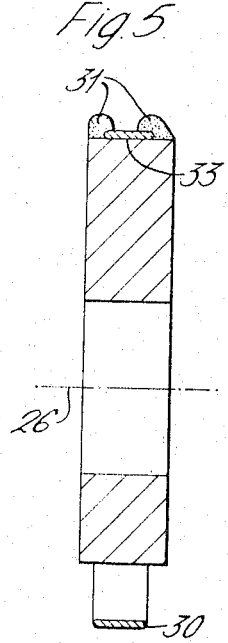
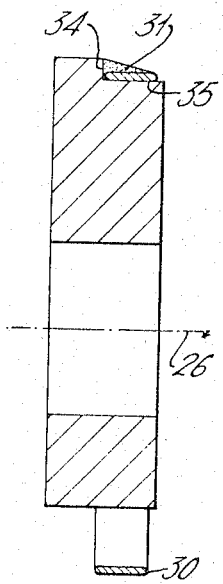
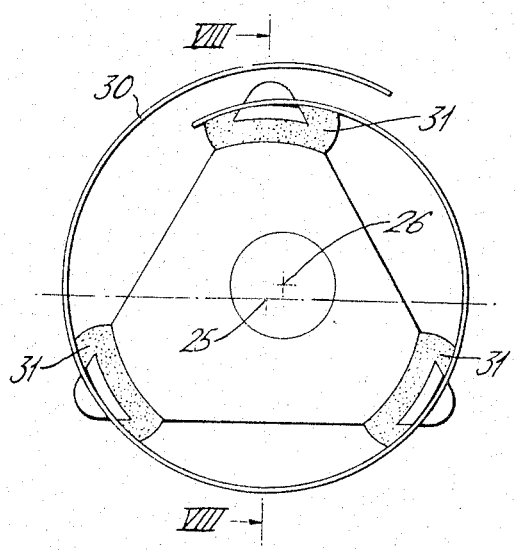
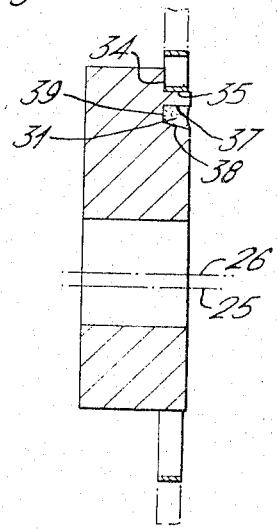
INVENTOR:
CECIL LESLIE BOULT
ATTORNEYS:
Hall, Pollack & Vonde Sande United States Patent Office 3,364,673
Patented Jan. 23, 1968

3,364,673
HOROLOGE HAIRSPRING ATTACHMENT COLLET
Cecil L. Boult, Clydach, near Swansea, South Wales, assignor to The Anglo-Celtic Watch Company Limited, London, England, a British company
Filed Aug. 30, 1965, Ser. No. 483,451
Claims priority, application Great Britain, Sept. 1, 1964, 35,730/64; Dec. 10, 1964, 50,277/64
5 Claims. (Cl. 58—115)

This invention relates to collets and to instruments, particularly clocks and watches, incorporating collets.

It is conventional in horology to attach the hairspring of a clock or watch to the balance staff by means of a collet. The collet is normally a circular disc with a central hole which is a friction fit on the balance staff and with a radial slot which extends through the axial thickness of the collet. The radial slot increases the resilience of the collet and facilitates the operation of fitting the collet on to the balance staff. In a known construction the collet has a channel lying along a chord which is at right angles to, but does not cross the slot. The channel extends through about half the axial thickness of the disc. The hairspring is formed with a number of spiral turns and with a straight leg at its inner end which is bent to lie at an obtuse angle to the innermost spiral turn. The leg is placed in the channel and the surface of the collet distorted to close the top of the channel thereby retaining the leg. During the operation of attaching the leg to the collet the innermost spiral turn usually becomes displaced axially out of the plane of the spiral and the axis of the spiral becomes displaced from the axis of the collet. The portion of the spring adjacent to the leg deviates from the shape of a true spiral so that the spring has to be manually bent to bring it to a spiral form and to bring its axis to the axis of the collet. This operation, of rectifying the spring, is laborious and requires considerable skill. In another known form of collet the channel is replaced by a bore, the axis of which lies on a chord which is at right angles to, but does not cross the slot. The leg of the balance spring is placed in the bore and a pin is forced into the bore retaining the leg. The spring must then be rectified to overcome the faults mentioned above.

A hairspring is normally attached to the spindle of an indicating instrument by one of the collets described.

According to one aspect of this invention there is provided a collet comprising a plate-like member provided with a circular hole for fitting onto a spindle and with at least three projecting portions, each projecting portion being formed with a wall at right angles to the plane of the member and against which a hairspring can be positioned, the walls being disposed so that they lie substantially on the same turn of a spiral centred on the axis of the hole.

Preferably the member is triangular in form, each apex being formed with a wall at right angles to the plane of the member.

Preferably each wall is in the form of an arc about the point equidistant from the three walls. If the walls are arcuate about the point equidistant from the three walls, the collet may be manufactured cheaply from a triangular metal plate by a turning operation.

The point equidistant from the three walls will always be spaced from the centre of the hole. The walls may be walls of channels formed in one of the plane surfaces of the member. In another possible arrangement the walls may be part of the edge of the member. In a further possible arrangement steps are formed at the edge of the member thus defining the said walls. The hairspring may be retained in position against the walls by adhesive.

In yet another possible arrangement the walls are the bases of channels formed in the edge of the member.

The hairspring may be retained in position by pushing inwardly one or both walls of the channel.

The part of the hairspring which does not lie on a spiral (that is the innermost part including the leg) is cut off before the hairspring is fitted to the collet.

Preferably the thicknesses of one or both of the walls of the channels are increased as they extend away from the bases of the channels so that they project above the surfaces of the member whereby a hairspring may be retained in the channels by pressing a plate against both sides of the plate-like member thereby forcing the said wall or walls of the channels inwardly. The operation of pressing a plate against both sides of the member will not normally distort the innermost turn of the hairspring out of the plane of the hairspring, as the forces applied to the member are substantially equal and opposite forces at right angles to its plane.

A collet in accordance with this invention has the advantage that when a hairspring is attached to it, an operation of rectifying the hairspring to bring it to spiral form is not normally necessary.

According to another aspect of this invention, there is provided an instrument including a collet as has been set forth, and a hairspring retained in position against the walls of the collet, the collet being fitted onto a spindle.

Five collets in accordance with this invention will now be described with reference to the accompanying schematic drawings of which:

FIGURE 1 is a plan view of a first collet to which a hairspring is attached.

FIGURE 2 is a view of the collet with a tool but omitting the hairspring, in the direction of the arrow II in FIGURE 1.

FIGURE 3 is a plan view of a second collet to which a hairspring is attached.

FIGURE 4 is a sectional view along the line IV—IV in FIGURE 3.

FIGURE 5 is a sectional view of a third collet to which a hairspring is attached.

FIGURE 6 is a sectional view of a fourth collet to which a hairspring is attached.

FIGURE 7 is a plan view of a fifth collet to which a hairspring is attached.

FIGURE 8 is a sectional view along the line VIII—VIII of FIGURE 7.

In FIGURES 3 to 8 like components are given like reference numerals.

Referring first to FIGURE 1 a brass collet 1 has the form of an equilateral triangle and is a plate-like member. The sides of the triangle are indicated at 2, 3 and 4, the apices at 5, 6 and 7 and the point equidistant from the apices 5, 6 and 7 (i.e. the centre of the circumscribed circle) at 10.

A circular hole is drilled through the collet 1 about an axis 11 offset from the point 10. At each apex a short channel 9 (FIGURE 2) is formed in the edge of the collet, the base of the channel being of circular form about the point 10. The thicknesses of the walls 12 of the channels 9 are progressively increased as they extend away from the bases of the channels 9 so that they project above the surfaces of the collet 1.

In use, the collet 1 is placed within the innermost turn of a hairspring 13, the portion of the hairspring which is not a true spiral having been previously removed. The axis of the hairspring 13 is colinear with the axis 11. The position of the collet 1 is adjusted until the innermost turn is lying within the three channels 9. The walls of the channels 9 are then forced inwardly by the two plates 14 (FIGURE 2) which are parallel to the collet 1 and are moved symmetrically towards the plane of the collet 1. The innermost turn of the hairspring 13 is not normally distorted out of the plane of the hairspring 1 as the forces exerted on it by the plates 14 are equal and opposite. An operation of rectification of the hairspring 13 will therefore be rarely necessary.

The hole 8 is for fitting the collet onto the balance staff of a clock or watch or the spindle of an instrument. The sides 2 and 3 adjacent to the hole 8 may be cut away to make the collet 1 more resilient and thereby facilitate fitting it onto the balance staff or spindle. The side 4 may be cut away to balance the collet statically and dynamically about the axis 11. It will be appreciated that the distance from the axis 11 to the point 10 will depend on the pitch of the spiral of the hairspring 13.

The apex 5 which is nearest to the axis 11 may be indicated by a mark on the surface of the collet 1.

The shape of the collet 1 facilitates rotating it when mounted on the balance staff or instrument spindle as a tool may be manufactured with a triangular cut away portion.

In a modification, the thickness of only one of the walls 12 of each channel is increased as it extends away from the base of its respective channel 9.

The channels 9 may be formed by a turning operation, the axis of rotation of the collet 1 being an axis passing through the point 10. The collet 1 may thus be manufactured relatively cheaply.

Referring now to FIGURE 3 a brass collet 21 has the form of an equilateral triangle and is a plate-like member. The apices of the triangle are indicated at 22, 23 and 24 and an axis passing through the point equidistant from the apices (i.e. the centre of the circumscribed circle) at 25. A circular hole 36 is drilled from the collet 21 about an axis 26 offset from the axis 25. A channel is formed in the surface of the collet 21 at each apex. Each channel (FIGURE 4) has a wall 27 parallel to the axes 25 and 26, a base 28 parallel to the plane surfaces of the collet 21 and a wall 29 at 45° to the base 28 and the surface of the collet 21. The walls 27 are of circular form about the axis 25. The walls 27 also lie substantially on a spiral centred on the axis 26, the wall 27 of the apex 22 being nearest to the axis 26.

In use, the innermost turn of a hairspring 30 (the portion of the hairspring which is not a true spiral having previously been removed) is placed in the three channels resting against the walls 27, the axis of hairspring 30 then being coincident with the axis 26. The hairspring 30 is retained in the channels by adhesive 31. The hairspring 30 is then in the form of a true spiral and an operation of rectification is unnecessary.

The circular hole 36 cut from the collet 21 enables the collet 21 to be fitted onto the balance staff of a clock or watch or the spindle of an instrument. The side of the collet 21 between the apices 23 and 24 is cut away (indicated at 32) to balance it statically and dynamically about the axis 26.

In a modification of the arrangement just described shown in FIGURE 5, channels are not formed in the surface of the collet 21 but the edge of each apex is cut away so to form a wall 33 which is of circular form about the axis 25. In use, the hairspring 30 rests against the walls 33 and is retained by the adhesive 31.

In another modification shown in FIGURE 6, a step is formed at each apex in place of the channel. Each step has a wall 35 parallel to the axes 25 and 26 and a base 34 lying in a plane at right angles to the axes 25 and 26.

The walls 35 are of circular form about the axis 25. The hairspring 30 rests against the walls 35 and is retained by the adhesive 31.

In the arrangements described in FIGURES 3 to 6, the adhesive 31 may be omitted and the hairspring 30 welded or soldered to the collet 21.

The arrangement shown in FIGURES 7 and 8 is similar to that shown in FIGURE 6 in that it is provided with walls 35 and bases 34 at its apices. It is, however, also formed with a channel at each of its apices similar to the channels of the arrangement shown in FIGURES 3 and 4. (The walls and bases of the channel are indicated at 37, 38 and 39.) The channels are filled with adhesive 31 which extends beyond the ends of the channels and adheres to the inner surface of the inner turn of the hairspring 30 which rests against the walls 35. The arrangement shown in FIGURES 7 and 8 has the advantage that as the adhesive 31 adheres to the inner surface of the inner turn of the hairspring 30, the distance between that turn and the adjacent turn may be small without risk of the adjacent turn coming into contact with the adhesive.

The collets shown in FIGURES 3 to 8 may have their apices shaped by a turning operation, the collets being rotated about the axis 25.

The collets shown in the drawings may be injection moulded from a thermoplastic material.

I claim:

1. The combination of a collet adapted to be supported for rotation about an axis and a hairspring whose innermost turn is attached to the collet so that the innermost turn has the form of a true spiral and the hairspring lies in a plane perpendicular to said axis, said collet being formed with three or more recesses lying substantially in said plane and spaced around said axis, each recess having a first wall surface perpendicular to said plane and a second wall surface substantially parallel to said plane, said first surfaces being of circular form centered on a common axis displaced from but parallel to said axis and being of small angular extent so that they lie substantially on said true spiral, the innermost turn of the hairspring being engaged on one face by said first surfaces and on one edge by said second surfaces but otherwise being free of engagement by said collet, said collet being shaped in the vicinity of each said recess to accommodate an adhesive bonding material which adheres both to said collet and to said hairspring.

2. The combination as claimed in claim 1 wherein said first wall surfaces engage the outer face of the innermost turn of the hairspring, the collet being cut away in regions lying between said first wall surfaces and said axis so as to accommodate said bonding material which adheres to the inner face of the innermost turn in the vicinity of each said first wall surface.

3. The combination as claimed in claim 1 wherein said first wall surfaces engage the inner face of the innermost turn of the hairspring and the collet is cut away to accommodate the said adhesive bonding material in regions lying between said first wall surfaces and said axis so that the material adheres to the inner face of the innermost turn in the vicinity of each said first wall surface.

4. The combination as claimed in claim 2 wherein said collet is triangular in form and each apex is provided with one of said recesses, said collet being cut away along one side of the triangle to balance the combination about said axis.

5. The combination as claimed in claim 3 wherein said collet is triangle in form and each apex is provided with one of said recesses, said collet being cut away along one side of the triangle to balance the combination about said axis.

References Cited

UNITED STATES PATENTS

| | | | |
|---|---|---|---|
| 2,391,816 | 12/1945 | Bennett | 58—115 |
| 3,013,380 | 12/1961 | Greiner | 58—115 |
| 3,121,307 | 2/1964 | Greiner | 58—115 |
| 3,071,365 | 1/1963 | Henchoz | 58—115 |
| 3,218,794 | 11/1965 | Baehni | 58—115 |
| 3,274,766 | 9/1966 | Desaules et al. | 58—115 |

ROBERT S. WARD, Jr., *Primary Examiner.*

RICHARD B. WILKINSON, *Examiner.*